United States Patent [19]

Michaud et al.

[11] Patent Number: 4,927,899
[45] Date of Patent: May 22, 1990

[54] ALKENYLOXYLATED AROMATIC POLYAMIDOIMIDES

[75] Inventors: Philippe Michaud, Villeurbanne; Yves Camberlin, Caluire, both of France

[73] Assignee: Rhone-Poulenc Chimie, Courbevoie, France

[21] Appl. No.: 328,240

[22] Filed: Mar. 24, 1989

[30] Foreign Application Priority Data

Mar. 24, 1988 [FR] France ................ 88 04136

[51] Int. Cl.$^5$ .................................................. C08G 18/34
[52] U.S. Cl. .................................................. 528/49
[58] Field of Search ........................................ 528/49

[56] References Cited

PUBLICATIONS

Patent Abstracts of Japan, vol. 11, No. 167, (C-425), [2614], May 28, 1987; & JP-A-61 293 966 (Sumitomo Chem. Co., Ltd.), 24-12-1986.

*Primary Examiner*—Maurice J. Welsh
*Attorney, Agent, or Firm*—Burns, Doane, Swecker & Mathis

[57] ABSTRACT

Novel curable aromatic polyamidoimides having alkenyloxy end groups, well adopted as coating solutions or for the production of solid shaped articles, are prepared by the direct interreaction among (i) an aromatic diisocyanate, (ii) a monoanhydride of a tricarboxylic acid and (iii) an alkenyloxylated monocarboxylic acid, and have the following structural formula (I):

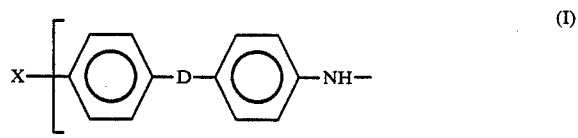

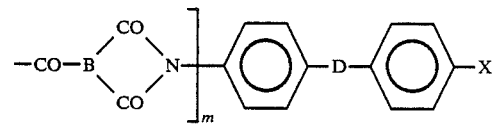

11 Claims, No Drawings

ALKENYLOXYLATED AROMATIC POLYAMIDOIMIDES

CROSS-REFERENCE TO COMPANION APPLICATION

Our copending application, Ser. No. 328,506, filed concurrently herewith and assigned to the assignee hereof.

BACKGROUND OF THE INVENTION

1. Field of the Invention

The present invention relates to novel aromatic polyamidoimides comprising alkenyloxy end groups, to a process for the preparation of such functional polyamidoimides, and to the use thereof, particularly for the production of crosslinked polymers.

2. Description of the Prior Art

Japanese Application JA-A-61/293,966 describes polyamidoimides containing end groups of the alkenyloxy type, which are prepared by carrying out the following steps, in series: a condensation reaction in solution between, in particular, the chloride of a monoanhydride of a tricarboxylic acid, a hydroxylated aromatic primary amine and, if desired, an aromatic diprimary diamine; then an etherification, using an allyl halide, of the hydroxyl end groups of the oligomers formed as the result of the condensation reaction. However, a process of this type presents a number of disadvantages. One of these disadvantages, which is common to most processes where an amino reactant is reacted with an organic carbonyl compound, such as a carboxylic acid anhydride, is in the need to carry out a cyclizing dehydration of the (poly)amides-acids formed as intermediates; in fact, since this reaction is balanced, the water liberated must be removed and this operation cannot generally be carried out to completion in solution. Another disadvantage is associated with the etherification reaction discussed above; this reaction is conducted in the presence of a strong base, such as sodium methylate, and such a condition is not favorable to the stability of the imide rings introduced by the oligomers which are already formed, which can be at least partially open and, consequently, can result in degradation of the desired polyamidoimides.

SUMMARY OF THE INVENTION

Accordingly, a major object of the present invention is the provision of novel polyamidoimides having alkenyloxy functional end groups, which novel polyamidoimides may be prepared by a process which does not exhibit the above disadvantages and drawbacks to date characterizing the state of this art. In this process, a cyclization and simultaneous polymerization result in the direct formation of linear functional polyamidoimides, accompanied by a release of carbon dioxide, a highly volatile compound which presents no risk of degrading the formed polymer. In addition, in the process of the invention it is not necessary to utilize any etherification reaction during the polymerization.

Briefly, the present invention features novel linear aromatic polyamidoimides having alkenyloxy end groups, and having the following general formula:

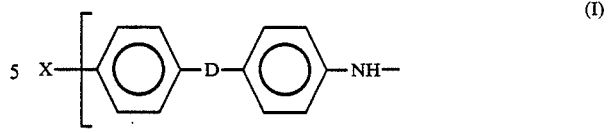
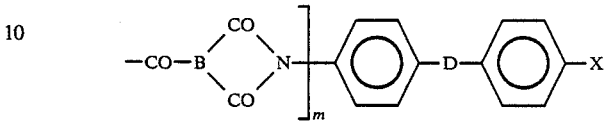
(I)

in which each of the symbols D, which are identical, is a single valence bond or one of the groups:

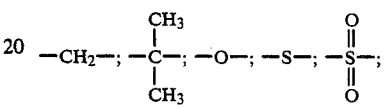

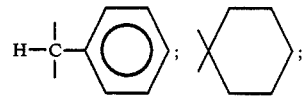

the symbol B is a trivalent radical comprising an aromatic radical containing at least 6 carbon atoms, substituted or unsubstituted, or of two of such radicals linked together by a single valence bond or one of the groups:

$$-CH_2-; \quad -\underset{\underset{CH_3}{|}}{\overset{\overset{CH_3}{|}}{C}}-; \quad -O-; \quad -\underset{\underset{O}{\|}}{\overset{\overset{}{}}{C}}-;$$

the symbol m is the average number of recurring structural units and is at least equal to 1, preferably ranging from 1 to 10; and each of the symbols X, which is identical, is a radical of the formula:

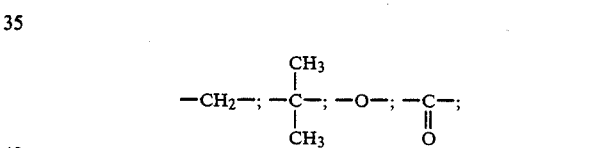
(II)

in which R is a hydrogen atom or a methyl radical; the (meth)allyloxy radical is in an ortho, meta or para position relative to the carbon atom of the benzene ring which is linked to the CONH group; R' is a methyl radical; and n is an integer equal to 0, 1, 2 or 3.

The above polyamidoimides according to the present invention may advantageously be prepared by heating the following reactants (i), (ii) and (iii), at a temperature ranging from 50° C. to 200° C. and in the presence of an organic solvent or a mixture of organic solvents, said reactants being simultaneously reacted:

(i) is a diisocyanate of the formula:

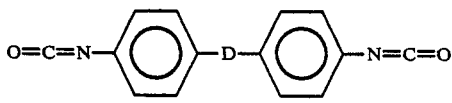

in which D is as defined above in formula (I);

(ii) is a monoanhydride of a tricarboxylic acid of the formula:

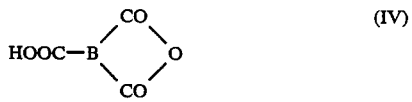

in which B is as defined above in formula (I); and (iii) is a monocarboxylic acid bearing an alkenyloxy substituent on the aromatic ring bonded to the carboxyl group and having the formula:

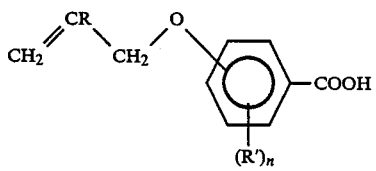

in which the symbols R, R' and n are as defined above in formula (II); with the proviso that the respective proportions of reactants (i) and (ii) are such that the ratio r:

$$\frac{\text{number of moles of diisocyanate (i)}}{\text{number of moles of anhydride (ii)}}$$

ranges from 1.05/1 to 2/1; and the proportion of reactant (iii) is such that the ratio r':

$$\frac{\text{number of moles of alkenyloxycarboxylic acid (iii)}}{\text{number of moles of diisocyante (i) } - \text{ number of moles of anhydride (ii)}}$$

is equal to 2.

DETAILED DESCRIPTION OF THE PREFERRED EMBODIMENTS OF THE INVENTION

More particularly according to the present invention, exemplary of the diisocyanate (i) of formula (III), particularly representative are:
4,4'-diisocyanato-2,2-diphenylpropane;
4,4'-diisocyanatodiphenylmethane;
4,4'-diisocyanatobiphenyl;
4,4'-diisocyanatodiphenyl sulfide;
4,4'-diisocyanatodiphenyl sulfone;
4,4'-diisocyanatodiphenyl ether; and
4,4'-diisocyanato-1,1-diphenylcyclohexane.
4,4'-diisocyanatodiphenylmethane and 4,4'-diisocyanatodiphenyl ether are the preferred according to the present invention.

Exemplary of the monoanhydrides of tricarboxylic acids (ii) of formula (IV), particularly representative are:
the monoanhydride of trimellitic acid;
the 2,3-monoanhydride of 2,3,6-naphthalenetricarboxylic acid;
the 1,8-monoanhydride of 1,8,4-naphthalenetricarboxylic acid;
the 1,2-monoanhydride of 1,2,5-naphthalenetricarboxylic acid;
the 3,4-monoanhydride of 3,4,4'-diphenyltricarboxylic acid;
the 3,4-monoanhydride of diphenyl sulfone 3,4,3'-tricarboxylic acid;
the 3,4-monoanhydride of diphenyl ether 3,4,4'-tricarboxylic acid; the 3,4-monoanhydride of 3,4,4'-benzophenonetricarboxylic acid; and the 3,4-monoanhydride of 3,4,3'-diphenylisopropylidenetricarboxylic acid.

Exemplary of the monocarboxylic acids bearing an alkenyloxy substituent (iii) of formula (V), particularly representative are:
2-allyloxybenzoic acid;
3-allyloxybenzoic acid;
4-allyloxybenzoic acid;
2-methallyloxybenzoic acid;
3-methallyloxybenzoic acid; and
4-methallyloxybenzoic acid.

4-Allyloxybenzoic acid is the preferred according to the present invention.

The monocarboxylic acids (iii) bearing an alkenyloxy substituent are compounds which are known to this art. They may be prepared, in particular, from hydroxybenzoic acids (ortho, meta or para). For example, hydroxybenzoic acid, the acidic functional group of which has first been converted into an ester functional group derived from a lower alcohol, may be reacted with an allyl or methallyl halide, depending on the circumstances (in most cases the bromide), the reaction being carried out in solution in acetone and in the presence of potassium carbonate. The acidic functional group is then regenerated by saponification.

The reaction for preparing the polyamidoimides according to the present invention is carried out in a homogeneous medium by adding to the reactants (i), (ii) and (iii) a solvent or a mixture of solvents which dissolve the reactants and the product formed. Suitable such solvents are polar solvents, in particular N,N-dimethylacetamide, N,N-dimethylformamide, N-methyl-2-pyrrolidone, dimethyl sulfoxide, 1,1,3,3-tetramethylurea, 1,3-dimethylurea and mixtures of these solvents; furthermore, they must be perfectly anhydrous.

The proportions of the reactants (i) and (ii) are preferably selected such that the ratio r:

$$\frac{\text{number of moles of diisocyanate (i)}}{\text{number of moles of anhydride (ii)}}$$

ranges from 1.1/1 to 1.5/1.

In practice, the starting reactants, which are used together, are dissolved in the solvent(s), the operation being preferably carried out under heating to a temperature of from 50° C. to 80° C., and the temperature of the resulting solution is then raised to the desired temperature, which does not exceed 200° C., either directly, or progressively. The operation is generally carried out at atmospheric pressure for a period of time which will vary to a large extent as a function of the precise temperature conditions which are adopted. Very preferably, the process of the invention entails raising the temperature during the reaction, from 50° C. to 80° C. at the beginning of the reaction up to 160° to 200° C., by following a program of a temperature increase on the order of 20° C. to 30° C. at the end of each unit of time, such unit of time varying from 20 minutes to 1 hour, 30 minutes. Once the desired maximum temperature (between 160° C. and 200° C.) has been reached, the temperature is maintained steady at this level for a period of time ranging from 30 minutes to 3 hours.

The reaction for preparing the polyamidoimides according to the present invention may be conducted in the presence of a suitable catalyst, if necessary. The catalysts which may be employed, where appropriate, are organic compounds which have no functional groups containing active hydrogen atoms capable of reacting with isocyanate groups. Those which are suitable in this respect are, especially, the tertiary amines belonging to the group of mono- or polycyclic compounds containing at least one intra- and/or extracyclic tertiary nitrogen atom; exemplary of suitable catalysts of this type are 1,4-diazobicyclo[2.2.2]octane, N,N'-dialkylpiperazines, N-alkylmorpholine and N-alkylpiperadine, in which compounds the alkyl radical is a methyl and/or ethyl radical. Metal salts may also be used as catalysts; exemplary thereof are, in particular, dibutyltin dilaurate and cobalt acetylacetone.

When a catalyst is indeed used, its quantity generally represents from 0.1 to 2% of the total weight of the reactants (i), (ii) and (iii) which are dissolved.

Upon completion of reaction, the polyamidoimide is obtained in the form of a solution. It can be precipitated by adding a nonsolvent or a mixture of nonsolvents to the reaction mixture, and the precipitated polymer may be isolated from the reaction mixture. Suitable nonsolvents are, for example, water, acetone, tetrahydrofuran, toluene or any other liquid which does not dissolve the desired polymer. The polymer can also be obtained by evaporating the solvent(s) from the reaction mixture in a ventilated oven.

In solution form, these functional polyamidoimides are particularly well suited for the manufacture of fibers, or for coating films and insulating varnishes, either while the solvent is being evaporated off, or subsequently. In precipitated form, these polymers are particularly useful for the manufacture of shaped products by injection- or compression-molding techniques.

One advantage of these polyamidoimides is in the fact that, by virtue of their reactive alkenyloxy end groups, they can be converted at any time during their processing (preferably after shaping) into crosslinked polymers having excellent mechanical and electrical properties, as well as high chemical inertness at temperatures of 200° C. to 300° C. This crosslinking is carried out merely by heating to a temperature of from 150° C. to 300° C. for a specified time in the presence, if desired, of a radical polymerization initiator or of an anionic polymerization catalyst.

The polyamidoimides according to the present invention can, furthermore, be used in copolymerization reactions with one or more other compound(s) containing groups capable of reacting with the reactive double bonds of the alkenyloxy end groups.

In order to further illustrate the present invention and the advantages thereof, the following specific examples are given, it being understood that same are intended only as illustrative and in nowise limitative.

EXAMPLE 1

1. Example according to the present invention:

The following materials were introduced in succession into a 400-cm$^3$ glass reactor fitted with an anchor-type central stirrer, in which a slight excess pressure of dry nitrogen was established and which was preheated to 80° C. with the aid of a suitable oil bath:

(i) 19.84 g (0.0793 mole) of 4,4'-diisocyanatodiphenylmethane;

(ii) 10.16 g (0.0529 mole) of monoanhydride of trimellitic acid;

(iii) 70 g of N-methyl-2-pyrrolidone; and (iv) 9.4 g (0.0528 mole) of 4-allyloxybenzoic acid.

The reaction was permitted to proceed for 4 hours, 30 minutes, under stirring, the temperature increase program shown below being followed:

(a) 1 hour at 80° C.;
(b) 1 hour at 100° C.;
(c) 30 minutes at 130° C.; and
(d) 2 hours at 160° C.

The polyamidoimide syrup or solution thus obtained was a brown-colored liquid mass weighing 102.5 g (it contained 32.5 g of polymer). No NCO and anhydride functional groups were detected in the syrup by infrared analysis.

The polyamidoimide was precipitated by adding water to the syrup. More precisely, 100 g of this syrup were added progressively, under vigorous stirring, to 500 cm$^3$ of water. The resulting precipitate was filtered off and was washed with water and then with acetone. It was then dried at 100° C. for 12 hours under a reduced pressure of $26.6 \times 10^2$ Pa. The granular product which was thus obtained was then finely ground and screened to retain particles smaller than 125 μm.

The polyamidoimide which had been prepared in the form of a powder in this example corresponded essentially to the following formula:

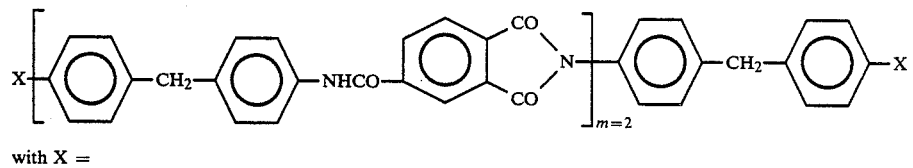

with X =

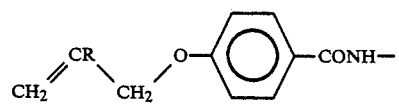

The powder obtained was subjected to various tests:

Determination of the glass transition temperature (Tg): this was determined by differential thermal analysis (DTA) at a rate of temperature increase of 10° C./min. The polyamidoimide prepared had a Tg of 176° C.

Measurement of loss of volatile material(s): the powder was placed for 2 hours in a ventilated oven which was heated to various temperatures:

(a) at 150° C.: 0.9% loss (% change relative to the initial weight);

(b) at 200° C.: 1.6% loss.

Heat test: the powder was soluble in N-methyl-2-pyrrolidone; after a heat test of 1 hour at 250° C., the powder became completely insoluble.

2. Description of the process for the preparation of the 4-allyloxybenzoic acid starting material:

An apparatus consisting of a glass reactor fitted with central stirring and a vertical condenser was employed, into which the following materials were introduced, in succession, at 25° C.:

(i) 50 g (0.301 mole) of ethyl 4-hydroxybenzoate;

(ii) 183.7 g of potassium carbonate; and (iii) 300 cm$^3$ of acetone.

The temperature of the reaction mixture was increased until the acetone refluxed, that is to say, up to 60° C. 43.7 g (0.361 mole) of allyl bromide were then introduced in 3 equal fractions with a 2-hour interval between each addition.

The reaction was then permitted to proceed for 8 hours under stirring. At the end of this time, the mixture was cooled to 40° C. and 310 cm$^3$ of demineralized water were added, followed by 150 cm$^3$ of diethyl ether, in order to extract the product formed. After phase separation, followed by evaporation of the diethyl ether, 48.3 g of a light-yellow liquid were obtained, whose structure corresponded to that of ethyl 4-allyloxybenzoate when analyzed by proton NMR.

A 25 g (0.121 mole) sample of this product was then taken and a saponification reaction was carried out thereon. The following were introduced in succession at 35° C. into a stirred reactor fitted with a vertical condenser:

(i) 25 g (0.121 mole) of ethyl 4-allyloxybenzoate; and (ii) 70 g of a methanolic solution containing 10 g (0.179 mole) of potassium hydroxide.

The reaction was then permitted to proceed for 16 hours under stirring. After this time, the precipitate formed was dissolved with 200 cm$^3$ of demineralized water. Acidification of the reaction mixture to pH=2 was carried out using 20 cm$^3$ of an aqueous solution containing 30% by weight of sulfuric acid. The precipitate obtained was filtered off and was then dried for 16 hours in an oven at $26.6 \times 10^2$ Pa and 60° C. 19.5 g of a white product having a melting point of 158° C. were then obtained, whose structure corresponded to that of 4-allyloxybenzoic acid when analyzed by proton NMR.

EXAMPLE 2

The procedure was as indicated above in Example 1, but starting with the following reactants:

(i) 17.66 g (0.0706 mole) of 4,4'-diisocyanatodiphenylmethane;

(ii) 12.33 g (0.0642 mole) of trimellitic anhydride;

(iii) 70 g of N-methyl-2-pyrrolidone; and (iv) 2.28 g (0.0128 mole) of 4-allyloxybenzoic acid.

The reaction was permitted to proceed for 6 hours, under satisfactory stirring, the temperature increase cycle shown below being followed:

(a) 1 hour at 80° C.;

(b) 1 hour at 100° C.;

(c) 1 hour at 130° C.;

(d) 1 hour, 15 minutes, at 160° C.; and (e) 1 hour, 45 minutes, at 180° C.

The syrup thus obtained was a brown-colored liquid mass weighing 96 g (it contained 26 g of polymer). No anhydride and NCO functional groups were detected in the syrup by infrared analysis.

The precipitation of the syrup in water and the washing and drying of the precipitate formed were identical with the operations described in Example 1. A beige powder was obtained, which was then finely ground and screened (particles below 200 μm).

The polyamidoimide which had thus been prepared in the form of powder in this example corresponded essentially to the formula given in Example 1, in which the symbol m is equal to 9.

The powder obtained was subjected to the following various tests:

Measurement of loss of volatile material(s) according to the method described in Example 1:

(a) at 200° C.: 2.57% loss;

(b) at 250° C.: 2.5% loss.

Molding: the powder obtained was heated to 200° C. for 1 hour and 7.5 g of it were then introduced into a cylindrical mold (5 cm diameter) and the entire assembly was placed between the two circular platens of a press (these platens were adapted to the size of the mold and were preheated to 300° C.), to which a pressure of 1 MPa was applied up to 250° C. (temperature of the material), and then of 10 MPa up to 300° C. When thermal equilibrium was attained at 300° C., the entire assembly was maintained under these conditions for 1 hour. The mold was allowed to cool and its content was placed between the two platens of the press for 12 hours under a pressure of 1 MPa. After demolding, a cylindrical object (diameter 5 cm, height 3 mm) was obtained, which had the following flexural mechanical characteristics (measured according to the data of ASTM Standard D 790 M; range=35 mm):

(a) flexural strength: 79.68 MPa, (b) flexural modulus: 1,980 MPa.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A linear aromatic polyamidoimide having alkenyloxy end groups and having the following general formula:

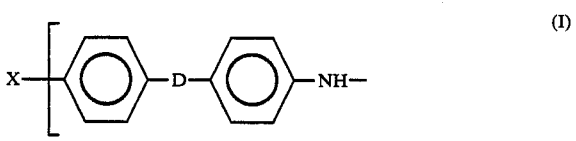

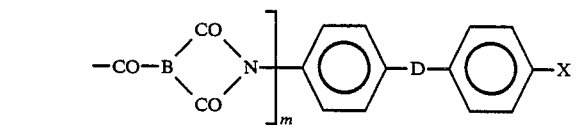

(I)

in which each of the symbols D, which are identical, is a single valence bond or one of the groups:

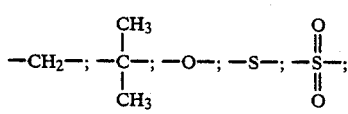

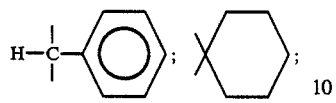

the symbol B is a trivalent radical comprising an aromatic radical containing at least 6 carbon atoms, substituted or unsubstituted, or of two such radicals linked together by a single valence bond or one of the groups:

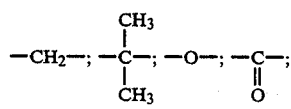

the symbol m is the average number of recurring structural units and is at least equal to 1; and each of the symbols X, which are identical, is a radical of the formula:

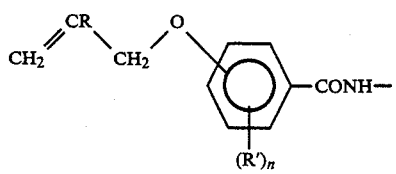

in which R is a hydrogen atom or a methyl radical; the (meth)allyloxy radical is in an ortho, meta or para position relative to the carbon atom of the benzene ring which is linked to the CONH group; R' is a methyl radical; and n is an integer equal to 0, 1, 2 or 3.

2. A process for the preparation of the aromatic polyamidoimide as defined by claim 1, comprising heating and simultaneously reacting the following reactants (i), (ii) and (iii) at a temperature ranging from 50° C. to 200° C. and in the presence of an organic solvent or mixture of organic solvents:

(i) is a diisocyanate of the formula:

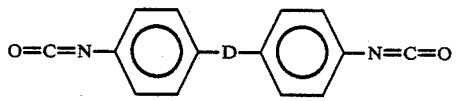

in which D is as defined in formula (I);
(ii) is a monoanhydride of a tricarboxylic acid of the formula:

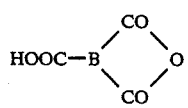

in which B is as defined in formula (I); and
(iii) is a monocarboxylic acid bearing an alkenyloxy substituent on the aromatic ring bonded to the carboxyl group and having the formula:

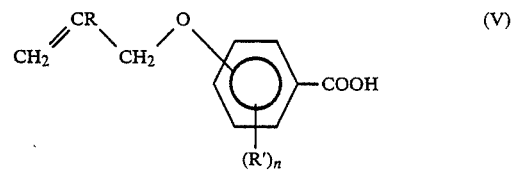

in which the symbols R, R' and n are as defined in formula (II); with the proviso that the respective proportions of the reactants (i) and (ii) are such that the ratio r:

$$r = \frac{\text{number of moles of diisocyanate (i)}}{\text{number of moles of anhydride (ii)}}$$

ranges from 1.05/1 to 2/1; and the proportion of the reactant (iii) is such that the ratio r':

$$r' = \frac{\text{number of moles of alkenyloxycarboxylic acid (iii)}}{\text{number of moles of diisocyante (i)} - \text{number of moles of anhydride (ii)}}$$

is equal to 2.

3. The process as defined by claim 2, said diisocyanate (i) of formula (III) comprising 4,4'-diisocyanato-2,2-diphenylpropane; 4,4'-diisocyanatodiphenylmethane; 4,4'-diisocyanatobiphenyl; 4,4'-diisocyanatodiphenyl sulfide; 4,4'-diisocyanatodiphenyl sulfone; 4,4'-diisocyanatodiphenyl ether; or 4,4'-diisocyanato-1,1-diphenylcyclohexane 4. The process as defined by claim 2, said monoanhydride of a tricarboxylic acid (ii) of formula (IV) comprising the monoanhydride of trimellitic acid; the 2,3-monoanhydride of 2,3,6-naphthalenetricarboxylic acid; the 1,8-monoanhydride of 1,8,4-naphthalenetricarboxylic acid; the 1,2-monoanhydride of 1,2,5-naphthalenetricarboxylic acid; the 3,4-monoanhydride of 3,4,4'-diphenyltricarboxylic acid; the 3,4-monoanhydride of diphenyl sulfone 3,4,3'-tricarboxylic acid; the 3,4-monoanhydride of diphenyl ether 3,4,4'-tricarboxylic acid; the 3,4-monoanhydride of 3,4,4'-benzophenonetricarboxylic acid; or the 3,4-monoanhydride of 3,4,3'-diphenylisopropylidenetricarboxylic acid.

5. The process as defined by claim 2, said monocarboxylic acid containing an alkenyloxy substituent (iii) of formula (V) comprising 2-allyloxybenzoic acid; 3-allyloxybenzoic acid; 4-allyloxybenzoic acid; 2-methallyloxybenzoic acid; 3-methallyloxybenzoic acid; or 4-methallyloxybenzoic acid.

6. The process as defined by claim 2, said starting reactants (i), (ii) and (iii) being dissolved together in an organic solvent or in a mixture of organic solvents, and said reaction being initially carried out at a temperature of from 50° C. to 80° C. and the temperature of the solution being directly or progressively raised to a temperature which does not exceed 200° C.

7. The process as defined by claim 2, carried out in a solvent comprising N,N-dimethylacetamide, N,N-dimethylformamide, N-methyl-2-pyrrolidone, dimethyl sulfoxide, 1,1,3,3-tetramethylurea, 1,3-dimethylurea, or mixture thereof.

8. A solution comprising the aromatic polyamidoimide as defined by claim 1.

9. A solid shaped article comprising the aromatic polyamidoimide as defined by claim 1.

10. The aromatic polyamidoimide as defined by claim 1, in crosslinked state.

11. A copolymer comprised of an aromatic polyamidoimide comonomer as defined by claim 1.

* * * * *